(12) United States Patent
Huston

(10) Patent No.: US 6,198,042 B1
(45) Date of Patent: Mar. 6, 2001

(54) SUSPENSION CLAMPS

(75) Inventor: Michael Ronald Huston, MacMasters Beach (AU)

(73) Assignee: Tyco Electronics Logistics AG (CH)

( * ) Notice: Subject to any disclaimer, the term of this patent is extended or adjusted under 35 U.S.C. 154(b) by 0 days.

(21) Appl. No.: 09/142,789

(22) PCT Filed: Mar. 18, 1997

(86) PCT No.: PCT/GB97/00748

§ 371 Date: Sep. 14, 1998

§ 102(e) Date: Sep. 14, 1998

(87) PCT Pub. No.: WO97/35372

PCT Pub. Date: Sep. 25, 1997

(30) Foreign Application Priority Data

Mar. 19, 1996 (NL) ........................................ 286216

(51) Int. Cl.⁷ ........................................ H02G 7/00
(52) U.S. Cl. .............. 174/40 R; 174/145; 174/168; 24/455; 24/326; 248/49
(58) Field of Search .................. 174/145, 146, 174/154, 158 R, 160, 168, 44, 40 TD, 44 TD, 43, 41, 70 A, 45 R, 45 TD, 40 R, 40 CC; 24/455, 326; 248/49

(56) References Cited

U.S. PATENT DOCUMENTS

| | | | | |
|---|---|---|---|---|
| D. 217,117 | * | 4/1970 | Gordon | 174/40 CC |
| 1,928,622 | * | 10/1933 | Hendee | 174/40 R |
| 3,155,354 | * | 11/1964 | Lindsey | 174/40 R |
| 3,161,721 | * | 12/1964 | Torr | 174/40 |
| 3,182,938 | * | 5/1965 | Gibbon | 174/40 R |
| 3,383,739 | * | 5/1968 | Pitzel | 174/40 R |
| 4,568,794 | * | 2/1986 | Kumamoto et al. | 174/40 R |

FOREIGN PATENT DOCUMENTS

| | | |
|---|---|---|
| 0255030 | 2/1988 | (EP) . |
| 2569912 | 3/1986 | (FR) . |
| 2708800 | 2/1995 | (FR) . |
| 122376 | 1/1967 | (NL) . |
| WO 94/26012 | 11/1994 | (WO) . |
| WO 97/07579 | 2/1997 | (WO) . |

OTHER PUBLICATIONS

International Search Report dated Jun. 27,1997 (6 pages).

* cited by examiner

Primary Examiner—Kristine Kincaid
Assistant Examiner—Adolfo Nino
(74) Attorney, Agent, or Firm—Dean W. Russell; Kyle M. Globerman; Kirkpatrick Stockton LLP

(57) ABSTRACT

A suspension clamp for suspending and clamping an elongate flexible member, the clamp having: (i) a saddle in which the elongate flexible member may sit, ii) a mounting to support the saddle with respect to a fixture, (iii) a closure latch to restrain the elongate flexible member in the saddle, and (iv) a resilient member mounted to the closure latch and having a bottom face adapted to clamp an elongate flexible member positioned within the saddle when the closure latch is closed.

16 Claims, 3 Drawing Sheets

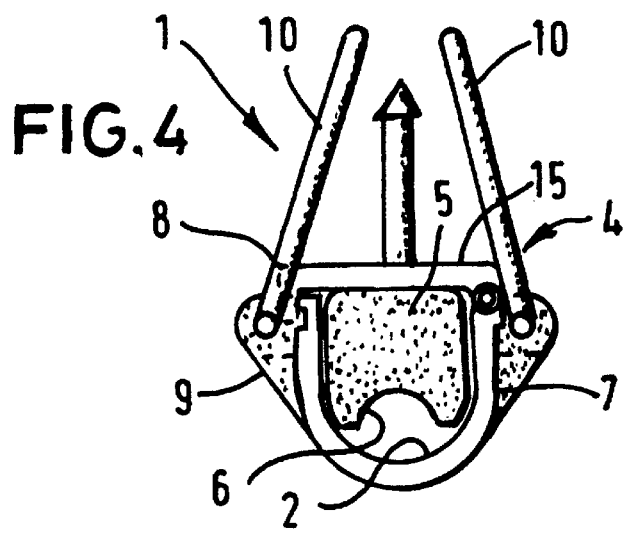
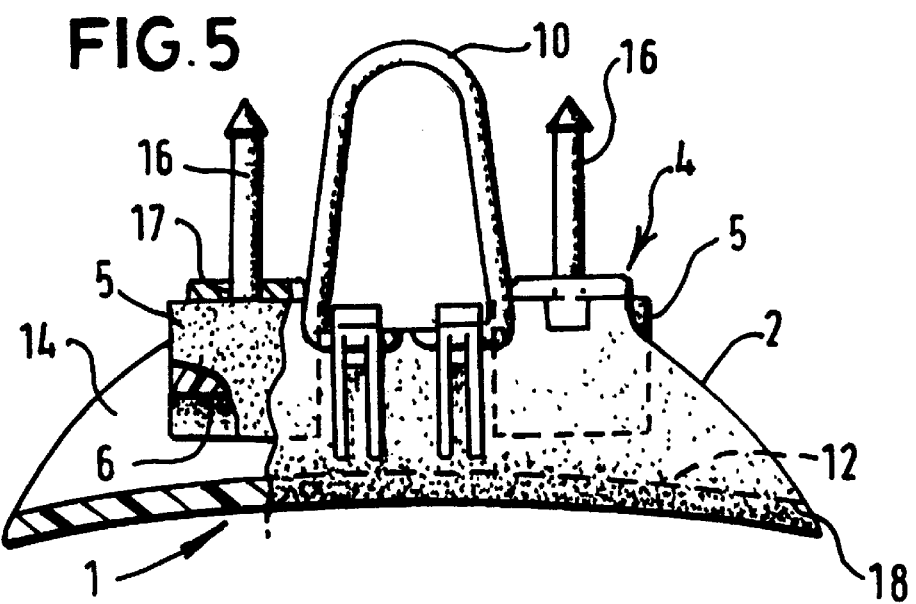
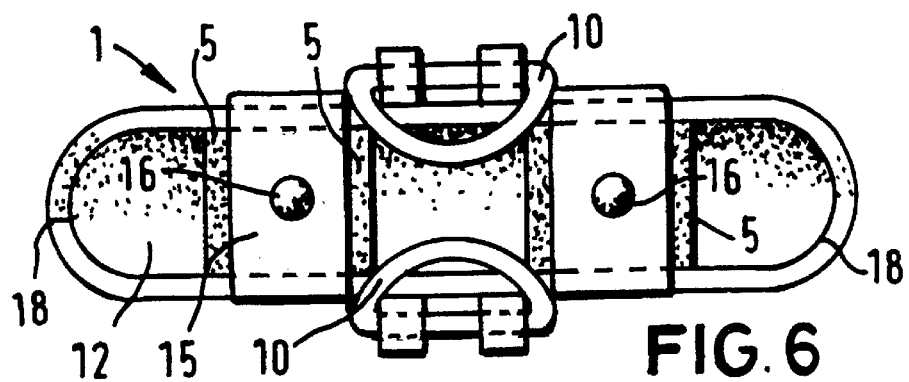

SUSPENSION CLAMPS

FIELD OF THE INVENTION

This invention relates to suspension clamps for clamping elongate flexible members, for example, cables. In the context of this specification the term cables should be interpreted as including among other things power cables, optical cables, ropes, and wires.

BACKGROUND OF THE INVENTION

Overhead power and/or communication cables are often clamped whilst in suspension. It is preferable that such clamps can be released as quickly as possible for installation and maintenance purposes.

The clamping forces applied to cables such as fibre optic cables should be sufficient to clamp the cables without causing mechanical damage. Suspension clamps should also cater for cables of different sizes.

SUMMARY OF THE INVENTION

The present invention provides a suspension clamp for elongate flexible members such as, for example, cables, the clamp comprising:
i) a saddle in which the elongate flexible member may sit,
ii) a mounting to support the saddle with respect to a fixture,
iii) a closure latch to restrain the elongate flexible member in the saddle
iv) a resilient member mounted to the closure latch and having a bottom face adapted to clamp an elongate flexible member positioned within the saddle when the closure latch is closed.

According to a further aspect of the present invention there is provided a suspension clamp as aforesaid wherein the closure latch is pivoted at a first side of the saddle.

According to yet another aspect of the present invention there is provided a suspension clamp as aforesaid wherein a free end of the closure latch is a snap-fit with a second side of the saddle.

According to yet another aspect of the present invention there are a plurality of closure latches.

According to yet another aspect of the present invention there are a plurality of resilient members.

According to yet a further aspect of the present invention there is provided a suspension clamp as aforesaid wherein the resilient member is mounted as a sliding fit with respect to the closure latch.

According to yet a further aspect of the present invention the mounting comprises one or more ringlets.

According to yet a further aspect of the present invention the mounting comprises one or more brackets According to yet a further aspect of the present invention there is provided a suspension clamp wherein the upper surface of the saddle which provides support for the elongate flexible member is generally arcuate.

According to yet a further aspect of the present invention there is provided a suspension clamp where the lower surface of the resilient member which clamps the elongate flexible member is generally arcuate.

Further aspects of the present invention will become apparent from the ensuing description which is given by way of example only and with reference to the accompany drawings in which:

BRIEF DESCRIPTION OF THE DRAWINGS

FIG. 4 is an end view of another form of suspension in accordance with the present invention, FIG. 5 is a side view in broken section of the suspension clamp of FIG. 4, FIG. 6 is a plan view of the suspension clamp of FIG. 4.

DETAILED DESCRIPTION

Figure 1:
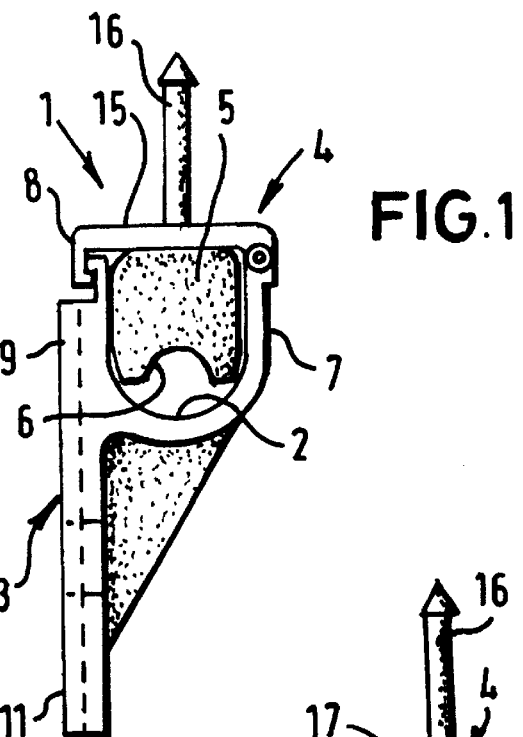
FIG. 1 is an end view of one form of a suspension clamp in accordance with the present invention.
Figure 2:
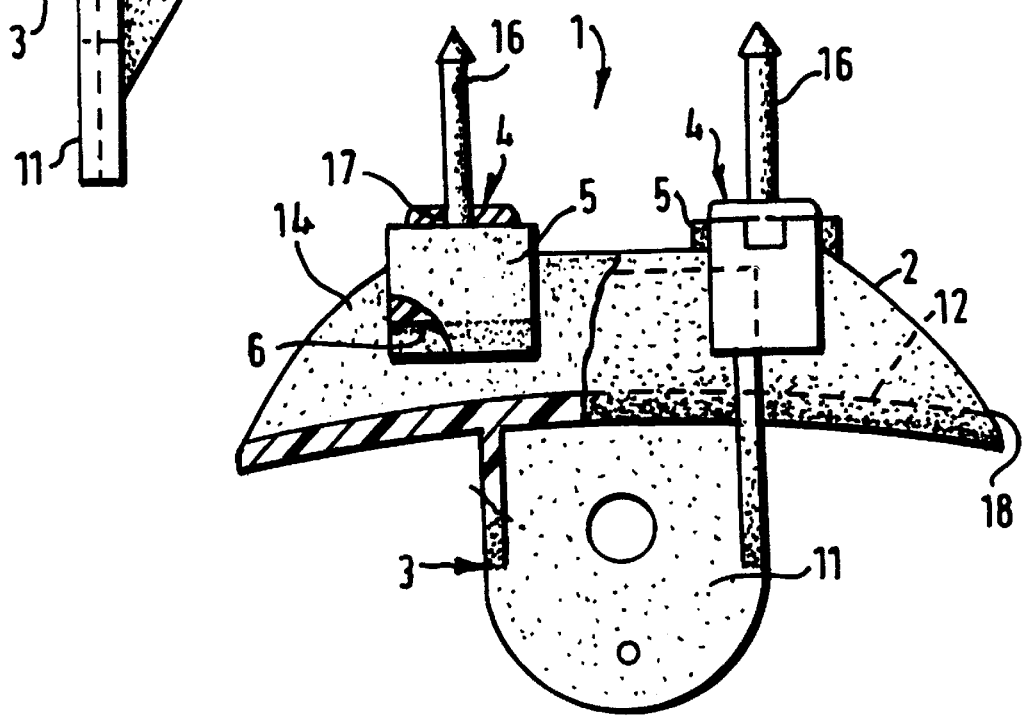
FIG. 2 is a side view in broken section of the suspension clamp of FIG. 1.
Figure 3:
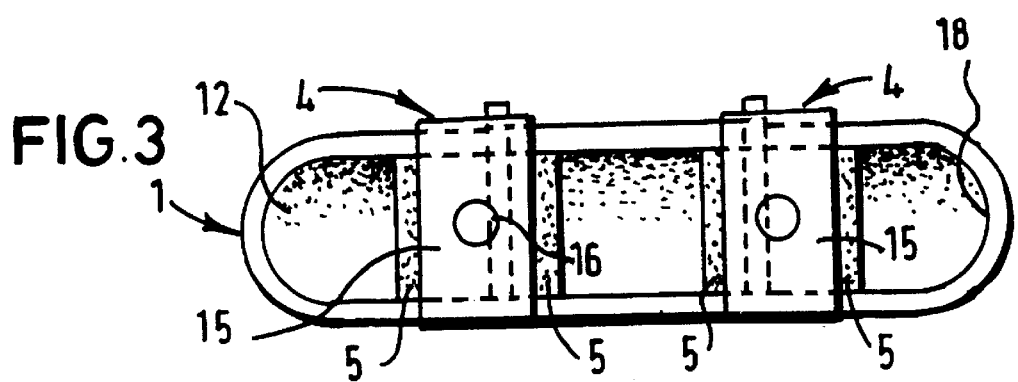
FIG. 3 is a plan view of the suspension clamp of FIG. 1.

With respect to the drawings suspension clamps in accordance with the three examples illustrated (the examples are either: 1) mounted with an integral bracket (FIGS. 1–3); 2) mounted using eyelets (FIGS. 4–6); or 3) mounted using a detachable mounting bracket (FIG. 7).) are generally indicated by arrow 1 and comprise a saddle 2, a mounting generally indicated by 3 by which the clamp can be supported with respect to a fixture, (not shown) and a pair of closure latches generally indicated by arrow 4 secured to the saddle 2, said closure latches 4 each mounting a resilient member 5 having a bottom face 6 adapted to clamp an elongate flexible member such as a cable in the saddle 2 when the closure latch is closed (as in the illustrated examples). It will be readily apparent to the skilled reader that it will be possible to provide single closure latches with a sufficient span to replace the pair of latches indicated and that such single closure latches may have one or more resilient members associated therewith. It will equally be clear to the skilled reader that several independent closure latches may share a common resilient member.

The resilient members 5 allow elongate flexible members of a range of diameters to be secured in the clamp, the variation in diameter being taken up by the resilience of the resilient members.

The closure latches 4 are pivoted at a first side 7 of the saddle 2. It will be clear to the skilled reader that the closure latches need not be pivotably mounted and may, for example, comprise detachable elements secured to the resilient members.

A free end 8 of each closure latch 4 is a snap-fit with the other side 9 of the saddle 2. It will be clear to the skilled reader that other means of securing the free end 8 are usable, for example, a secondary latch to interengage with and restrain the closure latch.

The resilient member 5 is a sliding fit in relation to the closure latch 4 being removable therefrom. However it will be clear to the skilled reader that the resilient member may in some circumstances be fixedly secured to the closure latch, for example, the closure latch and resilient member together may form a removable replaceable, disposable part of the clamp.

Figure 7:
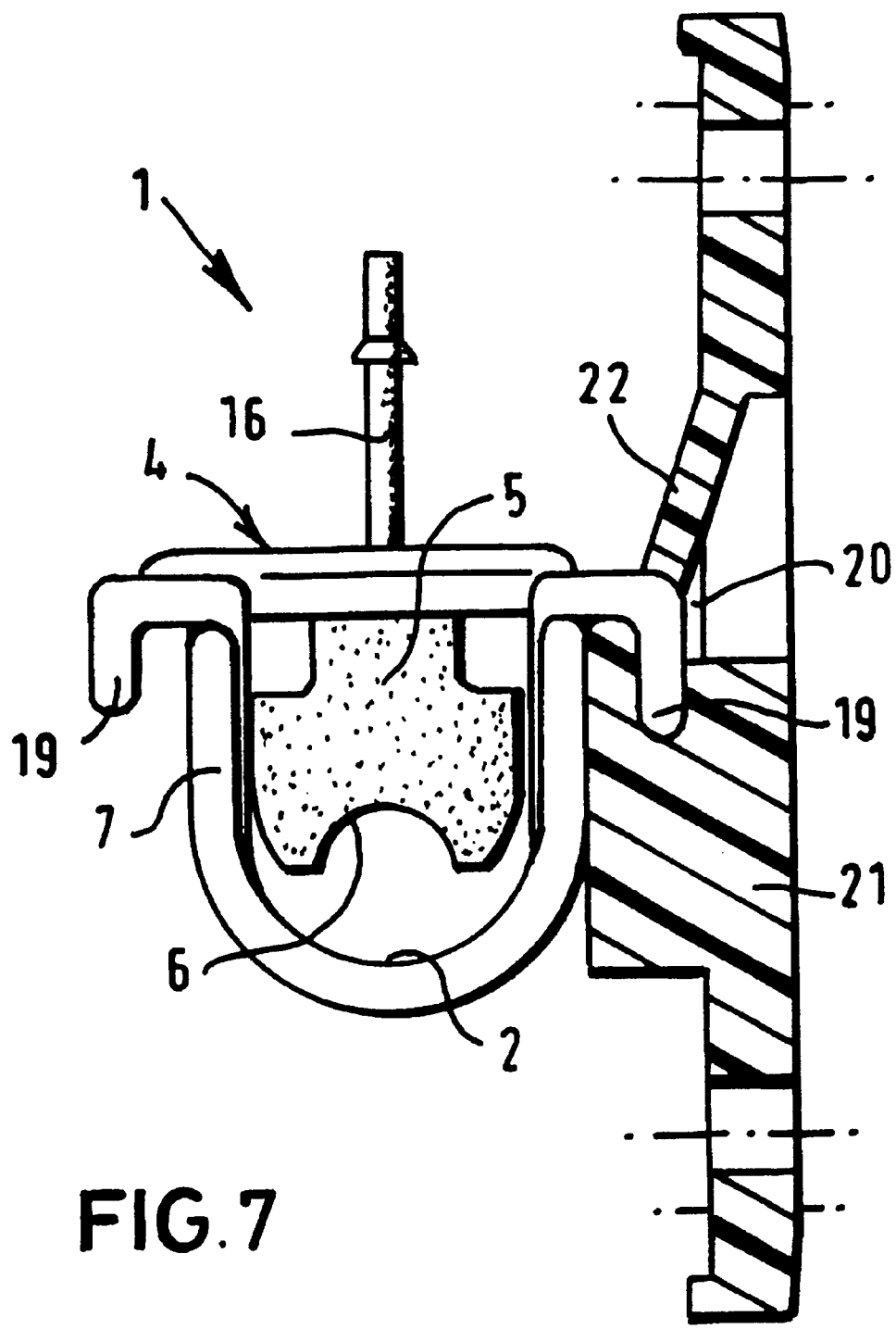
FIG. 7 is an end view of a further form of clamp showing a method of mounting same

The mounting 3 by which the saddle can be supported with respect to a fixture can comprise ringlet(s) 10 or bracket 11 but other mountings can readily be used. FIG. 7 shows an arrangement in which the saddle 2 carries flanges 19 either of which as required can engage as a snap fit in a slot 20 in bracket 21, spring arm 22 holding the flange securely.

The upper surface 12 of the saddle 2 is arcuate but angular or straight surfaces may be used. An arcuate surface is preferred so that the elongate member leaving the clamp is not kinked by the end edges 18 of the saddle 2.

The bottom face 6 of the resilient member 5 may also be arcuate but angular or straight surfaces may be used. It is however preferable that the bottom face 6 of the resilient member 5 correspond generally in form to the upper surface 12 of the saddle 2.

There are aspects of the examples illustrated by FIGS. 1 to 3 and 4 to 6 which are common to the examples. Common features include the overall shape and configuration of the saddle 2, the latches 4, and the resilient members 5.

The saddles 2 which may be formed of plastics (such as by injection moulding) or metal have an arcuate base face 12, side walls 14 which are curved and in each case the latch comprises a bar 15 which has one end pivoted at side 7 of the saddle, free ends 8 of latch engaging in a snap-fit arrangement with the other side 9 of the saddle.

Each latch 4 can be molded or otherwise formed of a resilient material and the snap-fitting can be provided by virtue of the complementarily stepped edges of the free ends 8 of each latch and side 9 of the saddle.

In the examples illustrated the resilient members 5 (which may be formed of rubber or another resilient material) each have tails 16 which are a sliding fit in apertures 17 of the latches. The tails 16 enable the resilient members 5 to be removed to ease stringing of the elongate flexible members in the saddles.

Apart from the features in common the clamps can be suspended or secured with respect to a fixture in any manner, e.g. by the use of mountings such as pivotally mounted eyelets (FIGS. 4 to 6), brackets 11 (FIGS. 1 to 3), or brackets 21 (FIG. 7) as in the arrangements indicated or in other suitable arrangements.

In use one may secure to suitable fixtures a plurality of suspension clamps as described above, string the elongate flexible members between the suspension clamps to sit in the saddles and close the closure latches to restrain the elongate flexible members in the saddles, the resilient members clamping the elongate flexible members in place.

It will be apparent that there are many ways of performing the present invention other than those exemplified which have been described by way of example only and it should be appreciated that modifications and additions may be made thereto without departing from the scope thereof.

What is claimed is:

1. A suspension clamp for an elongated flexible member, the suspension clamp comprising:

i) a saddle in which the elongated flexible member may sit, ii) a mounting to support the saddle with respect to a fixture, iii) a closure latch pivoted at a first side of the saddle and having a free end adapted to be a snap-fit with a second side of the saddle, and iv) a resilent member mounted to the closure latch and having a bottom face adapted to clamp the elongated flexible member against the saddle when the closure latch is closed.

2. A suspension clamp as claimed in claim 1 in which there are a plurality of closure latches.

3. A suspension clamp as claimed in claim 1 in which there are a plurality of resilient members.

4. A suspension clamp as claimed in claim 1 in which the resilient member is mounted as a sliding fit with respect to the closure latch.

5. A suspension clamp as claimed in claim 1 in which the mounting comprises one or more ringlets.

6. A suspension clamp as claimed in claim 1 in which the mounting comprises one or more brackets.

7. A suspension clamp as claimed in claim 1 in which the saddle has an arcuate upper surface that provides support for the elongated flexible member.

8. A suspension clamp as claimed in claim 1 in which the bottom face of the resilient member which clamps the elongated flexible member is acurate.

9. A method of suspending an elongated flexible member, the method comprising the steps of:

a) securing to suitable fixtures a plurality of suspension clamps each suspension clamp comprising:

i) a saddle in which the elongated flexible member may sit, ii) a mounting to support the saddle with respect to the fixtures, iii) a closure latch pivoted at a first side of the saddle to restrain the elongated flexible member in the saddle and having a free end adapted to be snap-fit with a second side of the saddle, and iv) a resilient member mounted to the closure latch and having a bottom face adapted to clamp the elongated flexible member against the saddle when the closure latch is closed;

b) stringing the elongated flexible member between the suspension clamps to sit in the saddles thereof;

c) closing the closure latches to restrain the elongated flexible member in the saddles, the resilient members of the plurality of suspension clamps clamping the elongated flexible member in place.

10. The method as claimed in claim 9 in which each suspension clamp further comprises a plurality of closure latches.

11. The method as claimed in claim 9 in which each suspension clamp further comprises a plurality of resilient members.

12. The method as claimed in claim 9 in which the resilient member of each suspension clamp is mounted as a sliding fit with respect to the closure latch.

13. The method as claimed in claim 9 in which the mounting of each suspension clamp further comprises one or more ringlets.

14. The method of claim 9 in which the mounting of each suspension clamp further comprises one or more brackets.

15. The method of claim 9 in which the saddle of each suspension clamp has an arcuate upper surface that provides support for the elongated flexible member.

16. The method as claimed in claim 9 in which the bottom face of the resilient member of each suspension clamp is arcuate.

* * * * *